United States Patent [19]

Ogawa et al.

[11] Patent Number: 4,492,734
[45] Date of Patent: Jan. 8, 1985

[54] MAGNETIC RECORDING MEDIUM

[75] Inventors: Hiroshi Ogawa; Yasuo Tamai, both of Odawara, Japan

[73] Assignee: Fuji Photo Film Co., Ltd., Minami-ashigara, Japan

[21] Appl. No.: 518,843

[22] Filed: Aug. 1, 1983

[30] Foreign Application Priority Data

Jul. 30, 1982 [JP] Japan ................. 57-132067

[51] Int. Cl.$^3$ .............................. B32B 27/30
[52] U.S. Cl. ..................... 428/424.2; 252/62.54; 428/425.9; 428/480; 428/522; 428/694; 428/900
[58] Field of Search ........... 428/692, 694, 900, 425.9, 428/424.2, 522, 480; 427/128; 252/62.54; 523/181

[56] References Cited

U.S. PATENT DOCUMENTS

| | | | |
|---|---|---|---|
| 4,022,701 | 5/1977 | Sawa et al. | 252/62.54 |
| 4,115,290 | 9/1978 | Kubota et al. | 252/62.54 |
| 4,241,139 | 12/1980 | Kubota et al. | 428/900 |
| 4,256,852 | 3/1981 | Naruse et al. | 523/181 |
| 4,352,859 | 10/1982 | Yoda et al. | 428/694 |
| 4,370,384 | 1/1983 | Hosaka et al. | 252/62.54 |
| 4,400,435 | 8/1983 | Yoda et al. | 428/695 |

*Primary Examiner*—George F. Lesmes
*Assistant Examiner*—William M. Atkinson
*Attorney, Agent, or Firm*—Armstrong, Nikaido, Marmelstein & Kubovcik

[57] ABSTRACT

A magnetic recording medium having an excellent running property as well as a high durability is provided which comprises a non-magnetic support and a magnetic layer provided thereon in which a ferromagnetic fine powder is dispersed in a binder consisting essentially of a copolymer of vinyl chloride, ethylene, vinyl acetate and maleic anhydride, optionally with a polyisocyanate.

10 Claims, No Drawings

MAGNETIC RECORDING MEDIUM

BACKGROUND OF THE INVENTION

1. Field of the Invention

This invention relates to a magnetic recording medium and more particularly, it is concerned with an improved magnetic recording medium having excellent properties, in particular, good running property and durability.

2. Description of the Prior Art

In magnetic recording materials, in particular, audio cassette tapes, which have lately been used for music recording, an excellent frequency characteristic and sound reproducing capacity are required. With the spread of car stereo and radio-cassette system, an excellent tape running property and durability are also required. On the other hand, in video cassette tapes, recording of very high density has been carried out by shortening the recording wavelength or by narrowing the track width and to this end, a higher S/N ratio and excellent image reproducing property are required. Furthermore, with the spread of portable VTR, there is an increased demand for VTR tapes having a decreased total thickness, i.e. less than 20 μm and a much higher running durability than in the prior art.

That is, both the audio tapes and video tapes are strongly required to have more excellent electromagnetic property, tape running property and durability than those of the prior art. For the purpose of meeting these requirements, various binder compositions have hitherto been proposed, but satisfactory binders have not been found yet.

At present, mixtures of copolymers of vinyl chloride/vinyl acetate/other vinyl compounds with urethane rubber resins have mainly been used as a binder composition from the standpoint of the dispersibility of ferromagnetic powders and the running property or durability of magnetic layers. The copolymers of vinyl chloride/vinyl acetate/other vinyl compounds include vinyl chloride/vinyl acetate/vinyl alcohol copolymers, vinyl chloride/vinyl acetate/maleic anhydride copolymers and the like and particularly, the vinyl chloride/vinyl acetate/maleic anhydride copolymers have often been used because of being excellent in dispersibility of ferromagnetic powders.

These prior art copolymers of vinyl chloride/vinyl acetate/maleic anhydride have generally compositions of 80 to 90% of vinyl chloride, 10 to 15% of vinyl acetate and 0.5 to 3% of maleic anhydride, which are commercially sold as a commercial name VMCH by Union Carbide Co., as S'LEC M by Sekisui Kagaku Kogyo KK, or as Denka Vinyl 1000 M by Denki Kogyo KK.

When using the prior art copolymers of vinyl chloride/vinyl acetate/maleic anhydride, however, the flexibility of a magnetic layer lacks, resulting in necessity of adding a large quantity of plasticizers and a large quantity of soft resins. In the case of adding a large quantity of plasticizers, problems tend to arise that blooming occurs and the durability of magnetic layers lowers, while in the case of jointly using a large quantity of polyurethane resins, problems tend to arise as to the dispersibility of ferromagnetic powders and the tape running property at a higher temperature and higher humidity.

Therefore, it is often difficult to obtain a magnetic recording medium with a sufficient running property and durability required at present by the prior art combinations of vinyl chloride/vinyl acetate/maleic anhydride copolymers and polyurethane resins.

SUMMARY OF THE INVENTION

It is an object of the present invention to provide an improved magnetic recording medium whereby the above described disadvantages can be overcome.

It is another object of the present invention to provide a magnetic recording medium having an excellent running property and durability.

It is a further object of the present invention to provide a video tape having a higher video output and S/N ratio as well as an excellent electromagnetic property.

These objects can be attained by a magnetic recording medium comprising a non-magnetic support and a magnetic layer provided thereon in which a ferromagnetic powder is dispersed in a binder consisting mainly of a copolymer of vinyl chloride, ethylene, vinyl acetate and maleic anhydride and optionally with a polyisocyanate.

DETAILED DESCRIPTION OF THE INVENTION

The inventors have made studies on various binder compositions for magnetic recording media and consequently, have found that a magnetic recording medium excellent in electromagnetic property, running property and durability can be obtained by using a binder consisting mainly of vinyl chloride/ethylene/vinyl acetate/maleic anhydride copolymer optionally with a polyisocyanate. This invention is based on this finding.

The vinyl chloride/ethylene/vinyl acetate/maleic anhydride copolymer according to the present invention has generally a composition of 50 to 95% by weight of vinyl chloride, 0.5 to 20% by weight of ethylene, 0.5 to 20% by weight of vinyl acetate and 0.5 to 5% by weight of maleic anhydride, preferably 60 to 90% by weight of vinyl chloride, 1 to 10% by weight of ethylene, 1 to 15% by weight of vinyl acetate and 1 to 3% weight of maleic anhydride. The polymerization degree of the copolymer of the present invention is preferably about 200 to 2000, more preferably 300 to 1000.

The vinyl chloride/ethylene/vinyl acetate/maleic anhydride copolymer of the present invention can be prepared by subjecting all the monomers to random copolymerization in known manner or by preparing first an ethylene/vinyl acetate/maleic anhydride copolymer and then subjecting to graft polymerization with vinyl chloride in known manner.

Instead of the maleic anhydride, other carboxyl group-containing monomers such as acrylic acid, methacrylic acid and the like can be used, but for the purpose of this invention, maleic anhydride is most suitable.

In the case of video tapes used under severer conditions than in the case of audio tapes, it is preferable to add a polyisocyanate to harden the magnetic layer. Useful examples of the polyisocyanate used jointly with the vinyl chloride/ethylene/vinyl acetate/maleic anhydride copolymer of the present invention are reaction products of three moles of a diisocyanate such as toluylene diisocyanate, xylene diisocyanate or hyxamethylene diisocyanate with 1 mole of trimethylolpropane, biuret adduct compounds of three moles of toluylene diisocyanate, isocyanurate adduct compounds of three moles of toluylene diisocyanate and 2 moles of hyxamethylene diisocyanate, polymer compounds of diphenylmethane diisocyanate and isophorone diisocyanate.

These compounds are available as commercial names "Colonate L", "Colonate HL", "Colonate 2030", "Millionate MR" and "Millionate MTL" from Nippon Polyurethane KK, as "Desmodur L", "Desmodur N", "Desmodur IL" and "Desmodur HL" from Sumitomo Bayer Urethane KK and as "Takenate D-102", "Takenate D-110 N" and "Takenate D-202" from Takeda Yakuhin Kogyo KK.

In the case of using jointly a polyisocyanate in the present invention, it is generally added to the binder composition in a proportion of about 40% or less by weight, since if more than about 40% by weight, the adhesiveness between a magnetic layer and support deteriorates.

The vinyl chloride/ethylene/vinyl acetate/maleic anhydride copolymer according to the present invention can optionally be used jointly with other resins miscible with the vinyl chloride/ethylene/vinyl acetate/maleic anhydride copolymer, such for example as cellulose resins such as nitrocellulose, vinylidene chloride/acrylonitrile copolymers, vinyl chloride/vinyl acetate copolymers, vinyl chloride/vinyl acetate/vinyl alcohol copolymers, vinyl chloride/vinyl acetate/maleic anhydride copolymers, polyurethane resins and polyvinyl butyral resins. These resins are generally used in a proportion of about 90% by weight or less, preferably about 60% by weight or less, more preferably about 40% by weight or less to the binder composition.

The binder consisting mainly of a vinyl chloride/ethylene/vinyl acetate/maleic anhydride copolymer optionally with a polyisocyanate according to the present invention is preferably used in a proportion of about 10 to 50% by weight, more preferably 15 to 30% by weight to a magnetic substance.

In the present invention, furthermore, plasticizers, stabilizers and lubricants can jointly be used. Details of these additives are described in "Vinyl Chloride Resins" published by Nikkan Kogyo Shinbunsha.

Preparation of the magnetic recording medium according to the present invention is carried out by coating onto a support a magnetic material obtained by dispersing the above described binder composition, a magnetic powder and additives with an organic solvent, followed by drying.

Useful examples of the ferromagnetic powders which can be used in the present invention are $\gamma$-$Fe_2O_3$, Co-doped $\gamma$-$Fe_2O_3$, $Fe_3O_4$, Co-doped $Fe_3O_4$, Berthollide compounds of $\gamma$-$Fe_2O_3$ and $Fe_3O_4$ (FeOx: $1.33 < x < 1.50$), Co-doped Berthollide compounds of $\gamma$-$Fe_2O_3$ and $Fe_3O_4$ (FeOx: $1.33 < x < 1.50$), $CrO_2$, Co-Ni-P alloys, Co-Ni-Fe alloys, Co-Ni-Fe-B alloys, Fe-Ni-Zn alloys, Fe-Mn-Zn alloys, Fe-Co-Ni-P alloys and Ni-Co alloys, as described in Japanese Patent Publication Nos. 14090/1969, 18372/1970, 22062/1972, 22513/1972, 28466/1971, 38755/1971, 4286/1972, 12422/1972, 17284/1972, 18509/1972, 18573/1972, 10307/1964 and 39639/1973, U.S. Pat. Nos. 3,026,215, 3,031,341, 3,100,194, 3,242,005 and 3,389,014, British Pat. Nos. 752,659, 782,762 and 1,007,323, French Pat. No. 1,107,654 and West German OLS No. 1,281,334.

The ferromagnetic fine powders have a grain size of preferably about 0.2 to 1 $\mu$m in length with a length to width ratio of 1:1 to 20:1.

In addition to the above described binder and ferromagnetic powder, other additives such as dispersing agents, lubricant, abrasives, antistatic agents and the like can be added to the magnetic recording layer.

Suitable dispersing agents are fatty acids containing about 12 to 18 carbon atoms represented by the general formula $R_1COOH$ wherein $R_1$ is an alkyl group containing about 11 to 17 carbon atoms, for example, caprylic acid, capric acid, lauric acid, myristic acid, palmitic acid, stearic acid, oleic acid, elaidic acid, linolic acid, linolenic acid, stearolic acid and the like; metallic soaps comprising the alkali metal (Li, Na, K, etc.) salts or the alkaline earth metal (Mg, Ca, Ba, etc.) salts of the above described fatty acids; and lecithin, etc. In addition, higher alcohols containing about 12 or more carbon atoms and the sulfates thereof can be used. These dispersing agents are generally used in a proportion of about 1 to 20 parts by weight per 100 parts by weight of a binder. These dispersing agents are described in Japanese Patent Publication Nos. 28369/1964, 17945/1969 and 15001/1973 and U.S. Pat. Nos. 3,387,993 and 3,470,021.

Suitable lubricants which can be used in the present invention include silicone oils, carbon black, graphite, carbon black graft polymers, molybdenum disulfide, tungsten disulfide, fatty acid esters produced from a monocarboxylic acid containing about 12 to 16 carbon atoms and a monohydric alcohol containing about 3 to 12 carbon atoms, fatty acid esters produced from a monocarboxylic fatty acid containing about 17 or more carbon atoms and a monohydric alcohol in which the total number of carbon atoms ranges from about 21 to 23 and the like. These lubricants are generally used in a proportion of about 0.2 to 20 parts by weight per 100 parts by weight of a binder. These lubricants are described in Japanese Patent Publication Nos. 18064/1966, 23889/1968, 40461/1971, 15621/1972, 18482/1972, 28043/1972, 32001/1972, 5042/1975, 14082/1977, 18561/1977, 8804/1977, 49803/1977, 67307/1977, and 70811/1977, U.S. Pat. Nos. 3,470,021, 3,492,253, 3,497,411, 3,523,086, 3,625,760, 3,630,772, 3,634,253, 3,642,539, 3,687,725, 3,996,407, 4,007,313, 4,007,314, 4,018,967 and 4,018,968 IBM Technical Disclosure Bulletin, Vol. 9, No. 7, page 779 (December 1966), and ELECTRONIK, No. 12, page 380 (1961), West Germany.

Typical abrasive agents which can be used in the present invention include fused alumina, silicon carbide, chromium oxide, corundum, diamond, synthetic diamond, garnet, emery (main component: corundum and magnetite) and the like. These abrasive agents have generally a Mohs' hardness of at least 5 and a mean particle size of 0.05 to 5 microns, preferably 0.1 to 2 microns, and are generally added in a proportion of 1 to 10 parts by weight to 100 parts by weight of the magnetic powder. Examples of the abrasives are described in Japanese Patent Publication Nos. 18572/1972, 15003/1973, 15004/1973 (U.S. Pat. No. 3,617,378), 39402/1974, and 9401/1975, U.S. Pat. Nos. 3,007,807, 3,041,196, 3,293,066, 3,630,910, 3,687,725 and 4,015,042 British Pat. No. 1,145,349, and West German Pat. No. 853,211 and 1,001,000.

Antistatic agents which can be used in the present invention include electrically conductive powders such as graphite, carbon black and carbon black graft polymers; natural surface active agents such as saponin; nonionic surface active agents such as alkylene oxide based, glycerol based and glycidol based surface active agents; cationic surface active agents such as heterocyclic compounds, e.g. higher alkylamines, quaternary ammonium salts, pyridine and the like; phosphoniums, sulfoniums and the like; anionic surface active agents containing acid groups such as carboxylic acid groups, sulfonic acid groups, phosphoric acid groups, sulfate groups, phosphate groups and the like; amphoteric surface active agents such as sulfates or phosphate of amino acids, amino sulfonic acids, amino alcohols and the like; etc.

Examples of the surface active agents which can be used as antistatic agents are described in U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174 and 3,545,974, West German Patent Application (OLS) No. 1,942,665, British Pat. Nos. 1,077,317 and 1,198,450, Ryohei Oda et al., "Kaimen Kassei Zai no Gosei to so no Oyo (Synthesis of Surface Active Agents and Their Applications), Maki Shoten, Tokyo (1964), A. M. Schwrats et al., "Surface Active Agents", Interscience Publications Corp., New York (1958), J. P. Sisley et al., "Encyclopedia of Surface Active Agents", Vol. 2, Chemical Publishing Co., New York (1964), "Kaimen Kassei Zai Binran (Handbook of Surface Active Agents)", 6th Ed., Sangyo Tosho Co., Tokyo (Dec. 20, 1966), etc.

These surface active agents can be used individually or in combination with each other. These surface active agents are generally used as antistatic agents, but in some cases, they are used for other purposes, for example, for improving dispersibility, magnetic properties and lubricity, or as an auxiliary coating agent.

Formation of a magnetic recording layer is carried out by dissolving or dispersing the above described composition in an organic solvent and then coating the resulting composition onto a support.

Suitable materials which can be used for this support are various plastics, for example, polyesters such as polyethylene terephthalate, polyethylene-2,6-naphthalate and the like, polyolefins such as polypropylene and the like, cellulose derivatives such as cellulose triacetate, cellulose diacetate and the like, polycarbonates, etc., and non-magnetic metals, for example, copper, aluminum, zinc, etc. Such a non-magnetic support can have a thickness of about 3 to 100 microns, preferably 5 to 50 microns in the form of a film or sheet.

The above described magnetic powder, binder, dispersing agent, lubricant, abrasive agent, antistatic agent and solvent are well blended or kneaded to prepare a coating composition. For kneading, the magnetic powder and other components are charged in a kneading machine simultaneously or separately. For example, a magnetic powder is added to a solvent containing a dispersing agent, kneaded for a predetermined period of time, then mixed with other components and kneaded sufficiently to prepare a magnetic coating composition. Various kneading machines are used for the kneading and dispersing, for example, two roll mills, three roll mills, ball mills, pebble mills, trommel mills, sand grinders, Szegvari attriters, high speed impeller dispersing machines, high speed stone mills, high speed impact mills, kneaders, high speed mixers, homogenizers, ultrasonic dispersing machines, etc. The kneading and dispersing techniques are described in T. C. Patton, "Paint Flow and Pigment Dispersion", published by John Wiley & Sons (1964) and U.S. Pat. Nos. 2,581,414 and 2,855,156.

The foregoing magnetic recording layer can be coated on a support using coating methods such as air doctor coating, blade coating, air knife coating, squeeze coating, dip coating, reverse roll coating, transfer roll coating, gravure coating, kiss coating, cast coating, spray coating and the like, and other coating methods can also be used. These methods are described in "Coating Kogaku (Coating Engineering)", page 253 to 277, published by Asakura Shoten, Tokyo (Mar. 20, 1971).

Typical organic solvents which can be used in the coating include ketones such as acetone, methyl ethyl ketone, methyl isobutyl ketone, cyclohexanone and the like; alcohols such as methanol, ethanol, propanol, butanol and the like; esters such as methyl acetate, ethyl acetate, butyl acetate, ethyl lactate, glycol monoethyl ether acetate and the like; ethers and glycol ethers such as diethyl ether, glycol monoethyl ether, glycol dimethyl ether, dioxane and the like; aromatic hydrocarbons such as benzene, toluene, xylene and the like; chlorinated hydrocarbons such as methylene chloride, ethylene chloride, carbon tetrachloride, chloroform, ethylene chlorohydrin, dichlorobenzene and the like; etc.

The thickness of the magnetic recording layer is generally 0.1 to 10 $\mu$m, preferably 0.2 to 5 $\mu$m.

Details of other ferromagnetic powders, additives and organic solvent, and dispersing methods and coating methods are as described in Japanese Patent Application (OPI) Nos. 108804/1977, 21805/1979 and 46011/1979.

The present invention will be explained in detail with reference to the following examples. It will be obvious to one skilled in the art that various changes and modifications can be made in the components, ratios, operational order and the like without departing from the spirit of the present invention. Therefore, the present invention should not be construed as being limited to the following examples. All parts used herein are to be taken as those by weight unless otherwise indicated.

EXAMPLE 1

| | |
|---|---|
| $\gamma$-Fe$_2$O$_3$ Powder (Hc 400 Oe, acicular ratio 10/1, mean grain length 0.4 $\mu$m) | 100 parts |
| Vinyl Chloride/Ethylene/Vinyl Acetate/ Maleic Anhydride Copolymer (polymerization degree 800, composition as shown in Table 1) | shown in Table 1 |
| Polyester Polyurethane (molecular weight 130,000) | shown in Table 1 |
| Oleic Acid | 2 parts |
| Methyl Ethyl Ketone | 150 parts |
| Cyclohexanone | 100 parts |

The above described composition was charged in a ball mill, kneaded and dispersed for 48 hours and then filtered through a filter having a mean pore diameter of 7 $\mu$m to obtain a coating composition for a magnetic layer.

The thus resulting coating composition was coated onto a polyethylene terephthalate film with a thickness of 7 $\mu$m to give a thickness of 5 $\mu$m on dry basis by means of reverse rolls, subjected, while still not dried, to an orientation treatment in a magnetic field using an electromagnet of 1000 gauss, dried, subjected to a supercalender roll treatment to smoothen the magnetic layer and then slit to obtain an audio cassette tape (Philips type compact cassette) with a width of 3.81 mm. The properties of the resulting tapes (Sample Nos. 1–5) are shown in Table 1.

COMPARATIVE EXAMPLE 1

The procedure of Example 1 was repeated except using a vinyl chloride/vinyl acetate/maleic anhydride copolymer (86/13/1% by weight, degree of polymerization about 400) of the prior art instead of the vinyl chloride/ethylene/vinyl acetate/maleic anhydride copolymer of Example 1 to obtain a cassette tape. The properties of the resulting tapes (Comparative Sample Nos. 1-3, represented by "C-No.") are shown in Table 1.

TABLE 1

| Sample No. | Composition of Copolymer (wt %) | | | | Amount of Copolymer | Amount of PU | MOL (dB) | SOL (dB) | TRP | C | TS |
|---|---|---|---|---|---|---|---|---|---|---|---|
| | VC | E | VAC | MA | | | | | | | |
| Example No. 1 | | | | | | | | | | | |
| 1 | 89 | 5 | 5 | 1 | 20 | — | 0.5 | 0.6 | A | A | A |
| 2 | 88 | 5 | 5 | 2 | 20 | — | 0.2 | 0.8 | A | A | A |
| 3 | 79 | 10 | 10 | 1 | 20 | — | 0.9 | 1.7 | A | A | A |
| 4 | 84 | 5 | 10 | 1 | 20 | — | 0.7 | 1.2 | A | A | A |
| 5 | 95 | 2 | 2 | 1 | 18 | 2 | 1.1 | 2.1 | A | A | A |
| Comparative Example No. 1 | | | | | | | | | | | |
| C-1 | 86 | — | 13 | 1 | 20 | — | −0.7 | −2.3 | C | B | A |
| C-2 | 86 | — | 13 | 1 | 18 | 2 | −0.4 | −1.1 | B | B | B |
| C-3 | 86 | — | 13 | 1 | 16 | 4 | 0.0 | 0.0 | A | B | C |

EXAMPLE 2

| | |
|---|---|
| Co-doped Berthollide Iron Oxide (Co 3.0 atomic %, FeO$_{1.4}$ Hc 660 Oe, acicular ratio 10/1 mean grain length 0.4 μm) | 100 parts |
| Vinyl Chloride/Ethylene/Vinyl Acetate/ Maleic Anhydride Copolymer (polymerization degree about 800, composition shown in Table 2) | shown in Table 2 |
| Oleic Acid | 2 parts |
| Butyl Stearate | 1 part |
| α-Alumina (mean grain diameter 0.5 μm) | 3 parts |
| Methyl Ethyl Ketone | 150 parts |
| Cyclohexanone | 100 parts |

The above described composition was kneaded and dispersed for 3 hours by means of a batchwise sand grinder, mixed with 6.7 parts (solid content 5.0 parts) of a polyisocyanate compound (Colonate L-75 made by Nippon Polyurethane KK), further kneaded and dispersed for 0.5 hour and then filtered through a filter having a mean pore diameter of 1 μm to obtain a coating composition for a magnetic layer.

The thus resulting coating composition was coated onto a polyethylene terephthalate film with a thickness of 14 μm to give a thickness of 5 μm on dry basis by means of reverse rolls, subjected, while still not dried, to an orientation treatment in a magnetic field using an electromagnet of 1500 gauss, dried, subjected to a supercalender roll treatment to smoothen the magnetic layer and then slit to obtain a video cassette tape (VHS type video cassette) with a width of ½ inch. The properties of the resulting video tapes (Sample Nos. 6-10) are shown in Table 2.

COMPARATIVE EXAMPLE 2

The procedure of Example 2 was repeated except using a vinyl chloride/vinyl acetate/maleic anhydride copolymer (86/13/1% by weight, degree of polymerization about 400) of the prior art instead of the vinyl chloride/ethylene/vinyl acetate/maleic anhydride copolymer of Example 2 to obtain a video cassette tape. The properties of the resulting tapes (Comparative Sample Nos. 4-5) are shown in Table 2.

EXAMPLE 3

The procedure of Example 2 was repeated except using an Fe-Zn alloy fine powder (Fe:Zn=90:10, Hc 1300 Oe, acicular ratio 10/1, mean grain length 0.3 μm) instead of the Co-doped Berthollide iron oxide of Example 2 to obtain a video tape. The properties of the resulting video tape (Sample No. 11) are shown in Table 2.

COMPARATIVE EXAMPLE 3

The procedure of Comparative Example 2 was repeated except using an Fe-Zn alloy (Fe:Zn=90:10, Hc 1300 Oe, acicular ratio 10/1, mean grain length 0.4 μm) instead of the Co-doped Berthollide iron oxide of Comparative Example 2 to obtain a video tape. The properties of the resulting video tape (Comparative Sample No. 6) are shown in Table 2.

TABLE 2

| Sample No. | Composition of Copolymer (wt %) | | | | Amount of Copolymer | Amount of Polyisocyanate | Amount of PU | Video Output (dB) | S/N Ratio (dB) | Video Running Property | Still Life (min) |
|---|---|---|---|---|---|---|---|---|---|---|---|
| | VC | E | VAC | MA | | | | | | | |
| 6 | 89 | 5 | 5 | 1 | 20 | 5 | — | 0.7 | 0.6 | A | 100 |
| 7 | 88 | 5 | 5 | 2 | 20 | 5 | — | 0.9 | 0.7 | A | more than 120 |
| 8 | 79 | 10 | 10 | 1 | 20 | 5 | — | 1.5 | 1.3 | A | 80 |
| 9 | 84 | 5 | 10 | 1 | 20 | 5 | — | 1.3 | 1.0 | A | 90 |
| 10 | 95 | 2 | 2 | 1 | 15 | 5 | 5 | 1.9 | 1.5 | B | more than 120 |
| C-4 | 86 | — | 13 | 1 | 20 | 5 | — | −0.6 | −1.0 | B | 40 |
| C-5 | 86 | — | 13 | 1 | 15 | 5 | 5 | 0.0 | 0.0 | B | 60 |
| 11 | 88 | 5 | 5 | 2 | 20 | 5 | — | 12.3 | 10.8 | B | 30 |
| C-6 | 86 | — | 13 | 1 | 15 | 5 | 5 | 11.4 | 9.5 | C | 10 |

The abbreviations and measuring methods shown in Table 1 and Table 2 are illustrated below:

Abbreviation

VC: Vinyl Chloride
E: Ethylene
VAC: Vinyl Acetate
MA: Maleic Anhydride
PU: Polyester Polyurethane
TRP: Tape Running Property
C: Contamination
TS: Tape Squeal Measuring Method (a) MOL 315

Maximum output level at 315 Hz when that of Comparative Sample No. C-3 is 0 dB (harmonic distortion factor 3%); measured by using a meter of 582 type made by Nakamichi KK.

(b) SOL 10K

Saturation output level at 10 KHz when that of Comparative Sample No. C-3 is 0 dB.

(c) Tape Running Property

Running tests are carried out at 25° C. and 50% RH, and at 40° C. and 80% RH using 100 commercially available cassette decks to assess the winding state:

A . . . no winding disorder
B . . . winding disorders found in 1–5 decks
C . . . winding disorders found in 5–10 decks
D . . . winding disorders found in 11 or more decks (d) Contamination After the assessment of the running property, contamination of a head in a deck is assessed as follows:

A . . . no or little contamination (hardly found)
B . . . some contamination to such an extent that does not matter
C . . . considerable contamination (e) Tape Squeal Tape squeal is assessed in the test of the running property:

A . . . no tape squeal
B . . . squeal occurring temporarily in 1–2 windings
C . . . squeal occurring temporarily in 3–5 windings
D . . . temporary squeal occurring in 5 or more windings and constant squeal occurring in 1–2 windings (f) Video Output Output at 4 MHz when that of Comparative Sample No. C-5 is 0 dB (meter: NV-6600 made by Matsushita Denki KK)

(g) S/N Ratio

S/N ratio at 10 KHz to 4 MHz subjected to visibility correction when that of Comparative Sample No. C-5 is 0 dB (meter: NV-6600 made by Matsushita Denki KK)

(h) Video Running Property

Running tests are carried out at 25° C. and 50% RH, and at 40° C. and 80% RH using 50 commercially available video cassette decks (VHS type) to assess the jitter and skew:

A . . . no jitter, nor skew
B . . . some jitter or skew to such an extent that does not matter
C . . . jitter or skew occurring often (i) Still Life Period of time (min) until an image is markedly degraded when reproduction is carried out at Still Mode, measured using a meter of NV-6600 made by Matsushita Denki KK.

The following will be apparent from these Examples and Comparative Examples:

As is evident from Table 1, Audio Cassette Tape Sample Nos. 1–5 using the vinyl chloride/ethylene/vinyl acetate/maleic anhydride copolymers according to the present invention each have higher MOL and SOL, i.e. more excellent electromagnetic property than Audio Cassette Tape Comparative Sample Nos. 1–3 using the vinyl chloride/vinyl acetate/maleic anhydride copolymer of the prior art. In addition, the use of the vinyl chloride/ethylene/vinyl acetate/maleic anhydride copolymers according to the present invention results in no problem as to the tape running property, contamination and tape squeal, while the use of the vinyl chloride/vinyl acetate/maleic anhydride copolymer of the prior art results in lowering of the tape running property when using jointly no polyurethanes, and results in tendency of tape squealing and deterioration of the durability due to the inferior humidity resistance when using jointly polyurehanes.

As is evident from Table 2, Video Tape Sample Nos. 6–10 using the vinyl chloride/ethylene/vinyl acetate/maleic anhydride copolymers according to the present invention each have a higher video output and S/N ratio, i.e. more excellent electromagnetic property, a better video running property, longer still life and more excellent running durability than Video Tape Comparative Sample Nos. C-4 and C-5.

As evident from comparison of Sample No. 11 with Comparative Sample No. C-6, the vinyl chloride/ethylene/vinyl acetate/maleic anhydride copolymer of the present invention is also superior to the vinyl chloride/vinyl acetate/maleic anhydride copolymer of the prior art even when using alloy fine powders.

It will clearly be understood from the foregoing results that a magnetic recording medium, which is more excellent in electromagnetic property, tape running property and durability than those of the prior art, can be obtained by the use of the vinyl chloride/ethylene/vinyl acetate/maleic anhydride copolymers according to the present invention.

What is claimed is:

1. A magnetic recording medium comprising a non-magnetic support and a magnetic layer provided thereon, said layer comprising a ferromagnetic powder dispersed in a binder consisting essentially of a copolymer of 50 to 95 percent by weight of vinyl chloride, 0.5 to 20 percent by weight of ethylene, 0.5 to 20 percent by weight of vinyl acetate, and 0.5 to 5 percent by weight of maleic anhydride, wherein the copolymer has a degree of polymerization of 200 to 2000.

2. The magnetic recording medium of claim 1, wherein a part or all of the maleic anhydride is replaced by at least one another carboxyl group-containing monomer selected from the group consisting of acrylic acid and methacrylic acid.

3. The magnetic recording medium of claim 1, wherein the binder is contained in a proportion of 10 to 50% by weight to the ferromagnetic powder.

4. The magnetic recording medium of claim 1, wherein the ferromagnetic powder is selected from the group consisting of powders of $\gamma$-$Fe_2O_3$, Co-doped $\gamma$-$Fe_2O_3$, $Fe_3O_4$, Co-doped $Fe_3O_4$, Berthollide compounds of $\gamma$-$Fe_2O_3$ and $Fe_3O_4$, Co-doped Berthollide compounds of $\gamma$-$Fe_2O_3$ and $Fe_3O_4$, $CrO_2$, Co-Ni-P alloys, Co-Ni-Fe alloys, Co-Ni-Fe-B alloys, Fe-Ni-Zn alloys, Fe-Mn-Zn alloys, Fe-Co-Ni-P alloys and Ni-Co alloys.

5. The magnetic recording medium of claim 1, wherein the ferromagnetic fine powder has a mean grain size of 0.2 to 1 μm in length with a length to width ratio of 1:1 to 20:1.

6. The magnetic recording medium of claim 1, wherein the binder further contains at least one other resin miscible with the vinyl chloride/ethylene/vinyl acetate/maleic anhydride copolymer, wherein said other resin is selected from the group consisting of cellulose resins, vinylidene chloride/acrylonitrile copolymers, vinyl chloride/vinyl acetate copolymers, vinyl chloride/vinyl acetate/vinyl alcohol copolymers, vinyl chloride/vinyl acetate/maleic anhydride copolymers, polyurethane resins, and polyvinyl butyral resins.

7. The magnetic recording medium of claim 6, wherein at least one of other resins is contained in a proportion of at most 40% by weight.

8. The magnetic recording medium of claim 1, wherein the binder contains further at least one polyisocyanate hardeners.

9. The magnetic recording medium of claim 8, wherein the polyisocyanate hardeners are reaction products of 3 moles of a diisocyanate and 1 mole of trimethylolpropane, biuret adduct compounds of 3 moles of hexamethylene diisocyanate, isocyanurate adduct compounds of 3 moles of toluylene diisocyanate and 2 moles of hexamethylene diisocyanate, polymer compounds of diphenylmethane diisocyanate and isophorone diisocyanate.

10. The magnetic recording medium of claim 8, wherein the polyisocyanate hardener is contained in the binder in a proportion of at most 40% by weight.

* * * * *